United States Patent [19]

Kano et al.

[11] Patent Number: 5,130,834
[45] Date of Patent: * Jul. 14, 1992

[54] LIQUID CRYSTAL DISPLAY INCLUDING A DYE COMPLEMENTARY TO THE LIQUID CRYSTAL'S BRIGHT STATE COLOR

[75] Inventors: Mitsuru Kano, Furukawa; Kenji Miyagawa, Nagoya; Masahiko Yamaguchi; Eiji Imaizumi, both of Furukawa, all of Japan

[73] Assignee: Alps Electric Co., Ltd., Tokyo, Japan

[*] Notice: The portion of the term of this patent subsequent to Jun. 5, 2007 has been disclaimed.

[21] Appl. No.: 263,458

[22] Filed: Oct. 27, 1988

[30] Foreign Application Priority Data

Feb. 19, 1988 [JP] Japan .................. 63-36650

[51] Int. Cl.$^5$ .................. G02F 1/137; G02F 1/13
[52] U.S. Cl. .................. 359/93; 359/98; 359/102
[58] Field of Search .............. 350/347 E, 349, 347 R

[56] References Cited

U.S. PATENT DOCUMENTS

| | | | |
|---|---|---|---|
| 4,541,693 | 9/1985 | Knoll et al. | 350/349 |
| 4,609,255 | 9/1986 | Leenhouts et al. | 350/337 |
| 4,664,482 | 5/1987 | Kando et al. | 350/347 E |
| 4,930,877 | 6/1990 | Kano et al. | 350/339 F |

FOREIGN PATENT DOCUMENTS 0060920 5/1980 Japan .................. 350/349

OTHER PUBLICATIONS

"Electro-optical performance of a new, black-white and highly multiplexable liquid crystal display" (Appl. Phys. Lett. 50(5), Feb. 2, 1987).

*Primary Examiner*—Stanley D. Miller
*Assistant Examiner*—Anita Pellman Gross
*Attorney, Agent, or Firm*—Guy W. Shoup; B. Noël Kivlin

[57] ABSTRACT

A liquid crystal display includes a pair of substrates and a liquid crystal composition sealed between the substrates. The liquid crystal composition has a twist angle set within a range of 180-300 degrees and a retardation set within a range of 0.45-0.7 $\mu$m wherein when an electric field is applied, the liquid crystal display is in a dark state, while when the electrid field is not applied, the liquid crystal display is in a bright state. A dichromatic coloring matter is contained in the liquid crystal composition, and it has a hue complementary to that of an image color of the liquid-crystal display in the bright state.

2 Claims, 1 Drawing Sheet

LIQUID CRYSTAL DISPLAY INCLUDING A DYE COMPLEMENTARY TO THE LIQUID CRYSTAL'S BRIGHT STATE COLOR

BACKGROUND OF THE INVENTION

The present invention relates to a liquid crystal display which can simultaneously realize clear black-white images and high-density information images.

As a TN (Twisted Nematic) liquid crystal display has some problems such that a visual angle is narrow and that it is disadvantageous for multiplexing drive, there has been proposed a SBE (Supertwisted Birefringence Effect) liquid crystal display.

However, since the SBE liquid crystal display exhibits yellow or blue images, the following attempts have been made so as to convert the yellow or blue images into the black-white images.

(1) OMI Mode

A retardation ($\Delta$nd) conventionally set at 0.8–0.9 is set to about 0.5–0.6, and a twist angle of liquid crystal molecules is set to a proper value within a range of about 180–300 degrees. Further, other parameters such as polarizing plate configuration and d/p (d=liquid crystal cell gap; p=twist pitch) are set to optimum values. (M. Schadt et al., Appl. Phys. LCH., 50(20), 236 ('87))

(2) GH Mode

Each parameter is set to an optimum value so that the SBE liquid crystal display may exhibit a high contrast in a blue mode of negative images, and a large amount (several %) of a dichromatic coloring matter of black is added to a liquid crystal composition, so as to obtain black-white images. (Nikkei Microdevice, p79-, October 1987)

(3) Phase Plate Mode

On the SBE liquid crystal display developing a high contrast, a non-display SBE cell having a twist direction reverse to that of the SBE liquid crystal display is laminated.

However, these attempts as mentioned above still have the following disadvantages.

In the OMI mode liquid crystal display, it is greatly difficult to simultaneously realize the improvement in definition of the black-white images and the increase in density of the images. Accordingly, it is obliged to slightly sacrifice both the definition and the density of the images, resulting in a slightly bluish coloring of the images.

In the GH mode liquid crystal display, it is necessary to add a large amount of dichromatic coloring matter. As a result, the images are dark, and there is a possibility of the coloring matter being deposited at low temperature. Additionally, the images are basically in the negative mode.

In the phase plate mode liquid crystal display, the manufacturing cost is increased, and the visual angle characteristics are unexpectedly inferior. Furthermore, similar to the GH mode liquid crystal display, the images in the phase plate mode liquid crystal display are basically in the negative mode.

SUMMARY OF THE INVENTION

Accordingly, it is a first object of the present invention to provide a liquid crystal display which may basically exhibit positive mode images and simultaneously realize clear black-white images and high density of the images.

It is a second object of the present invention to provide a liquid crystal display which may attain bright images and eliminate the possibility of the deposition of the coloring matter.

It is a third object of the present invention to provide a liquid crystal display which is improved in visual angle characteristics and may be manufactured at a low cost.

The liquid crystal display of the present invention is constituted basically of the OMI mode liquid crystal display, and a liquid crystal composition of the OMI mode liquid crystal display contains a dichromatic coloring matter developing a hue complementary to that in a bright or off state of the liquid crystal display in the case of excluding the dichromatic coloring matter.

According to the present invention, in order to improve a $\gamma$ characteristic indicative of an index of high information density and a contrast, various parameters such as retardation, twist angle of liquid crystal molecules, configuration of polarizing plate, d/p and material constant are set to optimum values in the basic OMI mode. The $\gamma$ characteristic is represented by $\gamma = V_{90}/V_{10}$ (where $V_{90}$ and $V_{10}$ stand for applied voltages when light transmittances are 90% and 10%, respectively).

In setting the parameters of the liquid crystal display primarily from the viewpoints of the $\gamma$ characteristic and the contrast, the twist angle of the liquid crystal molecules is set to a proper value within a range of 180–300 degrees, and the retardation is set to a proper value within a range of 0.45–0.7 $\mu$m.

The OMI liquid crystal display obtained in this stage normally exhibits colored images of blue-green close to white in the region where no electric field is applied.

According to the present invention, a dichromatic coloring matter is added to the liquid crystal composition of the OMI liquid crystal display. The dichromatic coloring matter to be used has a hue complementary to that of the image color in the off state of the OMI liquid crystal display, that is, in the region where no electric field is applied, in consideration of spectral characteristics of the image color in the off state. For example, in the case that the image color in the region of the OMI liquid crystal display where no electric field is applied is blue-green, the dichromatic coloring matter having a hue of orange-red is used.

It is sufficient to add a greatly small amount of the dichromatic coloring matter. Normally, 0.01–2% by weight, preferably 0.01–1% by weight of the dichromatic coloring matter is added with respect to a total amount of the liquid crystal composition. If the content of the dichromatic coloring matter exceeds 2% by weight, there is a possibility of the coloring matter being deposited at low temperature.

As mentioned above, the liquid crystal display of the present invention is constituted basically of the OMI liquid crystal display exhibiting positive images, and the liquid crystal composition of the OMI liquid crystal display contains the dichromatic coloring matter having a hue complementary to that of the image color of the OMI liquid crystal display in the off state. Accordingly, as shown in FIG. 1, light having a wavelength range less absorbed by the OMI liquid crystal display is absorbed by the dichromatic coloring matter. As a result, an image color of the liquid crystal display according to the present invention in the region where no electric field is applied is less dependent upon the wavelength of light.

Moreover, as the dichromatic coloring matter to be used in the present invention has a hue complementary to that of the image color of the OMI liquid crystal display in the off state, clear black-white images may be realized by adding a greatly small amount of the dichromatic coloring matter.

Other objects and features of the invention will be more fully understood from the following detailed description and appended claims when taken with the accompanying drawings.

DETAILED DESCRIPTION OF THE PREFERRED EMBODIMENTS

Example 1

The liquid crystal display according to the present invention was prepared to investigate black-white image quality, $\gamma$ characteristic, contrast ratio and visual angle characteristic.

A polyimide resin (SE-4110 preduced by Nissan Kagaku K.K.) was printed on a pair of highly smooth glass substrates (commercially available SBE substrates) formed with indium-tin oxide (ITO) electrodes. Then, the glass substrates were heated at 300° C. for 30 minutes to form an orientation film. Then, the orientation film was rubbed so that a left-handed helical twist angle of liquid crystal molecules may be 240 degrees. Then, a spherical spacer formed of silica was scattered onto one of the glass substrates, and a predetermined pattern of adhesive was printed on the glass substrate. Thereafter, the two glass substrates were bonded to each other to prepare a liquid crystal cell having a cell gap of 7 micrometers.

On the other hand, liquid crystal compositions as shown in Table 1 were prepared. A birefringence of the host liquid crystal AP-4601xx used was $\Delta n = 0.085$ at room temperature. Further, in filling the cell with the liquid crystal compositions prepared above, $\Delta nd$ was about 0.595 and d/p was about 0.54.

Each liquid crystal composition was filled into the liquid crystal cell, and the cell was sealed by an epoxy adhesive (Semedain Hisuper 30 produced by Semedain). Then, upper and lower polarizing plates (NPF-G1225DU produced by Nitto Denko K.K.) were attached to the cell.

Figure 1:
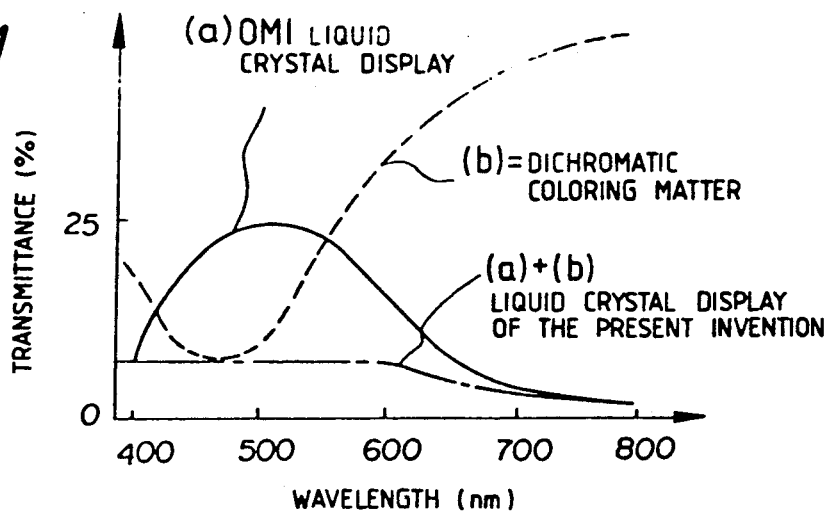
FIG. 1 is a spectral characteristic graph illustrating the operation of the liquid crystal display according to the present invention.
Figure 2:
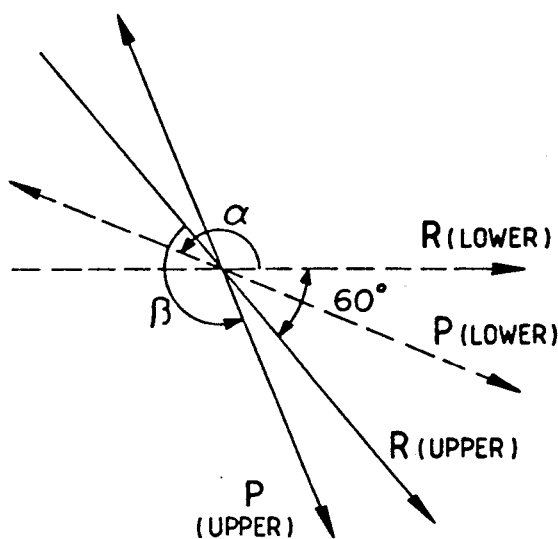
FIG. 2 is a schematic illustration of a deciding method for polarizing plate configuration to be described in Example 1.

Angles of polarizing axes of the polarizing plates were decided as rotating the polarizing plates so that the liquid crystal display may exhibit the positive images and the $\gamma$ value as an index of high-density information images and the contrast may be satisfactory. The configration of the polarizing plates as decided was such that letting the angles of polarizing axes P(upper) and P(lower) of the upper and lower polarizing plates relative to upper and lower rubbing axes R(upper) and R(lower) be denoted by $\beta$ and $\alpha$, respectively, as shown in FIG. 2, $(\beta, \alpha) = (60°, 30°)$ was set.

As comparisons with the liquid crystal displays prepared in Example 1, liquid crystal displays employing the liquid crystal compositions shown in Table 1, Columns K and L were prepared.

Using the liquid crystal displays prepared above, the following tests were conducted.

(1) Black-White Image Quality

Figure 3:
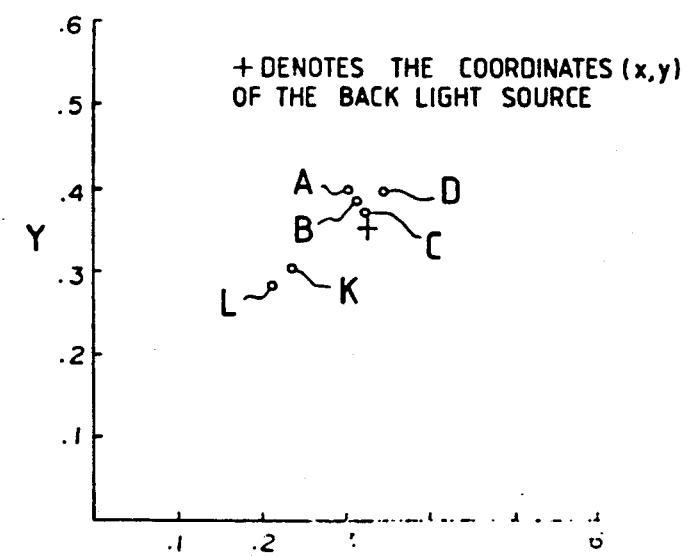
FIG. 3 is a chromaticity diagram of an image color of the liquid crystal display in the off state to be prepared in Example 1.

Using a daylight fluorescent lamp as a back light source under the condition where no electric field was applied, color of the liquid crystal displays was measured by a colorimeter (BM-5 produced by Tokyo Kogaku K.K.) and it was also visually determined. The total determination of black-white quality is shown in an X-Y chromaticity diagram of FIG. 3 and in Table 1. Referring to Table 1, Column of Black-White Image Quality, ⊚ represents that the image color was greatly approximated to the back light source; ○ represents that the image color was visibly recognized as a black-white image; Δ represents that the image color was felt to just have the other color; and × represents that the image color was not a black-white image apparently.

(2) $\gamma$ Characteristic

The liquid crystal displays were statically driven by applying a voltage of 1 KHz to investigate electro-optical characteristics of the liquid crystal displays and compare $\gamma$ values.

Referring to Table 1, Column of $\gamma$ characteristic, ⊚ represents $\gamma < 1.1$; ○ represents $1.1 \leq \gamma < 1.2$ and × represents $1.2 \leq \gamma$.

(3) Contrast

The liquid crystal displays were driven at a duty ratio of 1/100, and contrast ratios (Ct) were measured in a direction at an angle of 10 degrees relative to a normal to the substrates. Averages of the contrast ratios were compared.

Referring to Table 1, Column of Contrast, ⊚ represents $7.5 < Ct$; ○ represents $5 < Ct \leq 7.5$; and × represents $Ct \leq 5$.

(4) Visual Angle

Referring to Table 1, Column of Visual Angle, ⊚ represents that an angle capable of keeping $Ct \geq 5$ was greater than ±40 degrees; ○ represents that this angle was not greater than ±40 degrees; and × represents that this angle was not greater than ±20 degrees.

It is appreciated from Table 1 that the liquid crystal displays containing a proper quantity of dichromatic coloring matter having a hue of orange-red complementary to that of the light blue image color under the condition where no electric field was applied could exhibit clear black-white images and also make optimum the other characteristics such as $\gamma$ characteristic.

To the contrary, the liquid crystal display of the Comparison L containing a dichromatic coloring matter having a hue of blue could not exhibit good black-white images.

TABLE 1

| Samp. No. | Composition of liquid crystal composition | | | | | Test result | | | |
|---|---|---|---|---|---|---|---|---|---|
| | Host liquid crystal | Chiral additive (Content) | Coloring matter and its compounding ratio | Content of coloring matter | Hue of coloring matter | Black-white image quality | γ-Characteristic | Contrast | Visual angle |
| (A) | AP-4601xx (Produced by CHISSO K.K.) | S-811 (0.7%) (Produced by MERCK & CO., INC) | LSR-405:G233 = 3/1* | 0.5% | Red | Δ | ○ | ○ | ○ |
| (B) | AP-4601xx (Produced by CHISSO K.K.) | S-811 (0.7%) (Produced by MERCK & CO., INC) | LSR-405:G233 = 2/1 | 0.5% | Orange-red | ○ | ◉ | ○ | ◉ |
| (C) | AP-4601xx (Produced by CHISSO K.K.) | S-811 (0.7%) (Produced by MERCK & CO., INC) | LSR-405:G233 = 1/1 | 0.5% | Orange | ◉ | ◉ | ○ | ◉ |
| (D) | AP-4601xx (Produced by CHISSO K.K.) | S-811 (0.7%) (Produced by MERCK & CO., INC) | LSR-405:G233 = 2/1 | 0.5% | Red-orange | ○ | ○ | ○ | ○ |
| (E) | AP-4601xx (Produced by CHISSO K.K.) | S-811 (0.7%) (Produced by MERCK & CO., INC) | LSR-405:G233 = 1/1 | 0.001 | Orange | × ~ Δ | ○ | ○ | ○ |
| (F) | AP-4601xx (Produced by CHISSO K.K.) | S-811 (0.7%) (Produced by MERCK & CO., INC) | LSR-405:G233 = 1/1 | 0.01 | " | ○ | ○ | ○ | ○ |
| (G) | AP-4601xx (Produced by CHISSO K.K.) | S-811 (0.7%) (Produced by MERCK & CO., INC) | LSR-405:G233 = 1/1 | 0.4 | " | ◉ | ◉ | ○ | ◉ |
| (H) | AP-4601xx (Produced by CHISSO K.K.) | S-811 (0.7%) (Produced by MERCK & CO., INC) | LSR-405:G233 = 1/1 | 0.8 | " | ◉ | ◉ | ○ | ◉ |
| (I) | AP-4601xx (Produced by CHISSO K.K.) | S-811 (0.7%) (Produced by MERCK & CO., INC) | LSR-405:G233 = 1/1 | 2.0 | " | ○ | ○ | ○ | ○ |
| (J) | AP-4601xx (Produced by CHISSO K.K.) | S-811 (0.7%) (Produced by MERCK & CO., INC) | LSR-405:G233 = 1/1 | 5.0 | " | × | × | × | × |
| (K) (Comparison) | AP-4601xx (Produced by CHISSO K.K.) | S-811 (0.7%) (Produced by MERCK & CO., INC) | Coloring matter not contained | | (Colorless) | × | ○ | × | × |
| (L) (Comparison) | AP-4601xx (Produced by CHISSO K.K.) | S-811 (0.7%) (Produced by MERCK & CO., INC) | LMB-083** | 0.5 | Blue | × ~ Δ | ○ | ○ | ○ |

*LSR405 ... Produced by MITSUBISHI KASEI K.K., Hue: red
G233 ... Produced by NIPPON KANKO SHIKISO K.K., Hue: yellow-orange
**LMB-038 Produced by MITSUBISHI KASEI K.K.

Example 2

The cell gap was changed into 6.0 micrometers and the same test as in Example 1 was conducted. While $\Delta nd \approx 0.51$ μm $d/p \approx 0.49$ were obtained in Example 2, the test result was similar to that in Example 1.

Example 3

The cell gap was changed into 8.0 micrometers and the same test as in Example 1 was conducted. While $\Delta nd \approx 0.68$ μm and $d/p \approx 0.615$ were obtained in Example 3, the test result was similar to that in Example 1.

Example 4

The host liquid crystal was changed into AP-4602xx (produced by Chisso K. K.) and the same test as in Example 1 was conducted. While $\Delta n$ was 0.083 at room temperature, and $\Delta nd \approx 0.59$ μm and $d/p \approx 0.54$ were obtained in Example 4, the test result was similar to that in Example 1.

Example 5

The cell gap was changed into 5.5 micrometers and the same host liquid crystal as in Example 4 was used, and the same test as in Example 1 was conducted. While $\Delta nd \approx 0.46$ μm and $d/p \approx 0.43$ were obtained in Example 5, the test result was similar to that in Example 1.

Example 6

The cell gap was changed into 6 micrometers and the host liquid crystal was changed into AP-4603xx (produced by Chisso K.K.; $\Delta n = 0.105$ (at room temperature)), and the same test as in Example 1 was conducted. While $\Delta nd \approx 0.59$ μm and $d/p \approx 0.54$ were obtained in Example 6, the test result was similar to that in Example 1.

It was recognized from Examples 1–6 that when $\Delta nd \approx 0.45$–$0.7$ μm and $d/p \approx 0.45$–$0.7$ were set, clear black-white images could be realized without sacrificing the other characteristics.

Example 7

The coloring matters of LSR-405 and G-233 were changed into LSR-401 (hue: red) and G-232 (hue: yellow-orange), respectively, and the same test as in Example 1 was conducted. It was recognized from the test result that even when the kind of the coloring matter was changed, provided that the coloring matter has a hue complementary to that of the image color of the liquid crystal display in the off state, clear black-white images could be realized.

Example 8

A plurality of liquid crystal cells having twist angles 180, 200, 225, 270 and 300 degrees were prepated, and the same tests as in Examples 1-7 were conducted. Each cell could realize clear black-white images.

It was realized from the test result that the twist angle could be set to a proper value within a range of 180-300 degrees. If the twist angle exceeds 300 degrees, the uniformity of orientation of the liquid crystal molecules is damaged to result in no practical use.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A liquid crystal display comprising:
    a pair of substrates;
    a liquid crystal composition sealed between said substrates, said liquid crystal composition having a twist angle set within a range of 180-300 degrees and a retardation set within a range of 0.45-0.7 $\mu$m, wherein when an electric field is applied, said liquid crystal display is in a dark state, while when the electric field is not applied, said liquid crystal display is in a bright state; and
    a dichromatic coloring matter contained in said liquid crystal composition, said dichromatic coloring matter having a hue complementary to that of an image color of said liquid crystal display in the bright state.

2. The liquid crystal display according to claim 1, wherein said dichromatic coloring matter is added in an amount of 0.01-2 percent by weight of said liquid crystal composition.

* * * * *